United States Patent [19]
Olson

[11] 4,097,246
[45] Jun. 27, 1978

[54] METHOD OF MAKING AN ABRASIVE WIRE FOR SAWING STONE

[75] Inventor: Norman R. Olson, Worcester, Mass.

[73] Assignee: Olson Manufacturing Company, Holden, Mass.

[21] Appl. No.: 701,518

[22] Filed: Jul. 1, 1976

[51] Int. Cl.² .............................................. C04B 31/16
[52] U.S. Cl. .................... 51/309 R; 51/295; 125/21
[58] Field of Search .................. 51/293, 309, 295; 125/21, 18, 19, 20

[56] References Cited
U.S. PATENT DOCUMENTS

| | | | |
|---|---|---|---|
| 3,547,608 | 12/1970 | Kitazawa | 51/295 |
| 3,615,309 | 10/1971 | Dawson | 51/293 |
| 3,630,699 | 12/1971 | Catlin | 51/293 |
| 3,847,569 | 11/1974 | Snow | 51/309 |
| 3,854,898 | 12/1974 | Whitney et al. | 51/293 |

*Primary Examiner*—Donald J. Arnold
*Attorney, Agent, or Firm*—Thompson, Birch, Gauthier & Samuels

[57] ABSTRACT

Improved method of making an abrasive wire for sawing stone. The improvement resides in the step of affixing the solid abrasive body to the support element. This step is accomplished by deforming the axially protruding free end of the underlying smaller diameter portion of the support element so that it enlarges and assumes the same diameter as the larger diameter other end of the support element, thereby sandwiching and locking the abrasive body solidly therebetween.

10 Claims, 9 Drawing Figures

METHOD OF MAKING AN ABRASIVE WIRE FOR SAWING STONE

BACKGROUND OF THE INVENTION

This invention is an improvement over Snow, U.S. Pat. No. 3,847,569 issued Nov. 12, 1974. In that patent, a collar is concentrically slipped over the axially protruding free end of the underlying smaller diameter portion of the support element. The collar is swaged to the support element to sandwich and lock the abrasive body therebetween.

The object of the present invention is to eliminate the collar, to produce an improved bonding of the abrasive body to the support element, and to produce a more uniformly dense abrasive body.

SUMMARY OF THE INVENTION

The Snow patent discloses a method of making an abrasive wire for sawing stone. The Snow method utilizes the following steps:

(a) forming a support element into a shape having two contiguous cylindrical portions, the first portion having a larger diameter, and the second portion having a smaller diameter;

(b) positioning the support element into the bore of a die;

(c) inserting abrasive powder containing a mixture of diamond grit and a binder into the bore of the die around the smaller diameter second portion;

(d) compressing the abrasive powder towards the larger diameter first portion so that a part of the smaller diameter second portion protrudes beyond the compressed abrasive powder;

(e) heating the abrasive powder to produce a solid abrasive body;

(f) forming a central axial bore through the support element;

(g) inserting a length of flexible wire rope through the support element bore;

(h) placing a collar concentrically over the smaller diameter second portion; and (i) swaging the collar to the support element, and the support element to the wire rope.

The present invention modifies and improves the Snow process by omitting the use of a collar. Instead, the present invention deforms the protruding smaller diameter second portion so that it has the same diameter as the larger diameter first portion. This deforming step produces a stronger bond between the support element and the abrasive body, and also produces a more uniformly dense abrasive body.

DESCRIPTION OF THE PREFERRED METHOD

Figure 1:
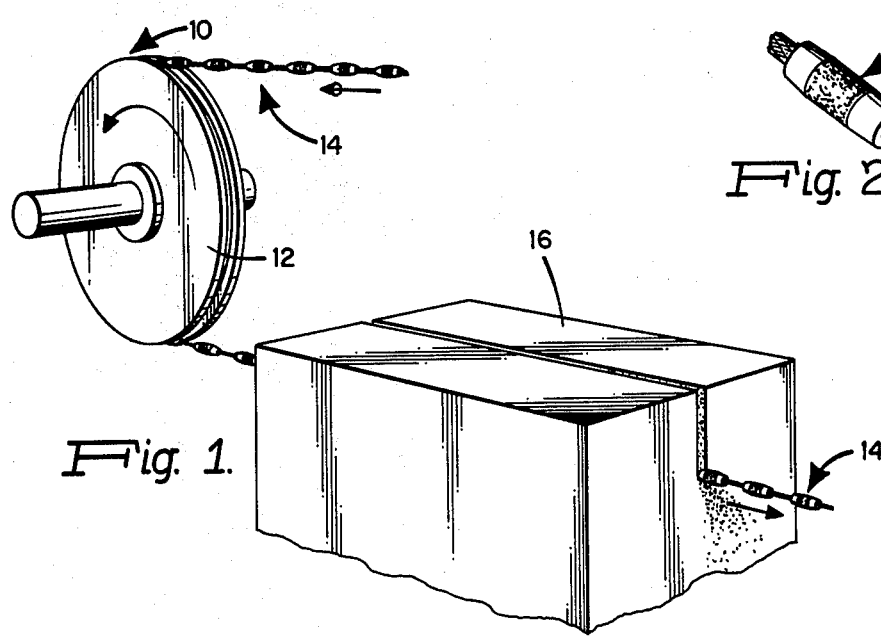
FIG. 1 is a perspective view of a portion of a sawing machine shown sawing through a block of granite.

The abrasive wire of the present invention is used on a conventional sawing machine 10 as shown schematically in FIG. 1. This machine employs a pair of spaced-apart pulley wheels 12 around which an endless loop of abrasive wire 14 travels. Each pulley wheel 12 has a circumferentially grooved rim for retaining the wire 14 and one of the wheels is driven by an unshown powered drive means. This arrangement produces an upper return reach and a lower sawing reach.

In operation, the pulley wheels 12 are lowered towards the stationary granite block 16, or the granite block is raised towards the vertically stationary pulley wheels. In either arrangement, the granite block 16 is sawed by the lower reach of the sawing machine 10 as the abrasive wire 14 is pulled across the granite surface with a sawing action. This operation, as just described, is entirely conventional.

Figure 2:
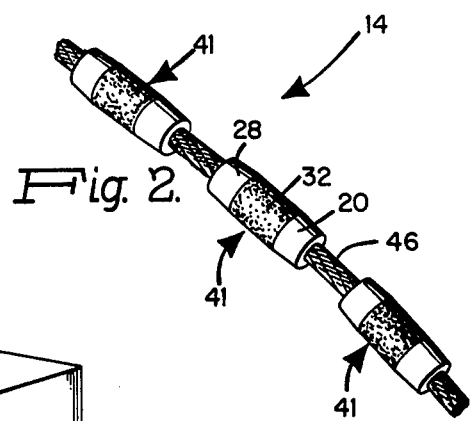
FIG. 2 is a perspective view of the abrasive wire used on the sawing machine of FIG. 1.
Figure 6:
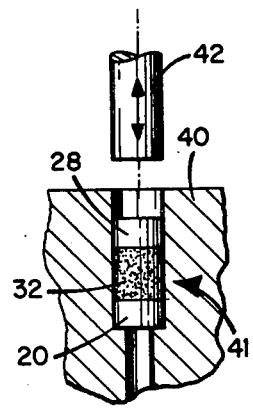
FIG. 6 is a sectional view of the support element and the abrasive body which have been positioned within the bore of a die; and of the solid ram which has deformed the protruding part of the second portion of the support element so that it assumes the same diameter as that of the first portion.
Figure 7:
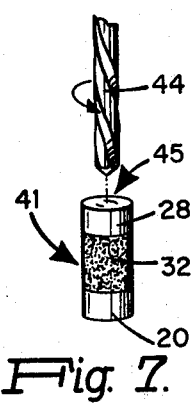
FIG. 7 is a perspective view of the support element being centrally bored by a drill bit.
Figure 8:
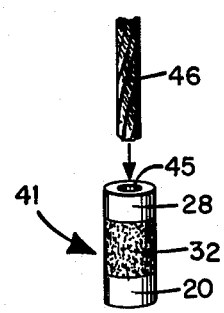
FIG. 8 is a perspective view of the support element being strung on a length of wire rope.

The present invention resides in the method of making the abrasive wire shown in FIG. 2. The method steps are shown sequentially in FIGS. 3–9, with FIG. 6 showing the novel method step which is the crucial and most important feature of this invention. Other important features are shown in other figures, such as FIG. 3.

Generally speaking, the method of this invention is an improvement over the method disclosed in Snow, U.S. Pat. No. 3,847,569 issued Nov. 12, 1974. It is not believed necessary to restate in detail the disclosure of the Snow patent which is briefly described in the foregoing Summary of the Invention. In the Snow patent, a separate collar is slipped concentrically over the axially protruding free end of the underlying smaller diameter portion of the support element. The collar is swaged to the support element to sandwich and lock the abrasive body therebetween. The present invention does not use a separate collar at all. Instead, the present invention upsets the protruding free end of the support element to sandwich and lock the abrasive body therebetween. The upsetting step creates a more secure bond between the abrasive body and the support element. The upsetting step also causes a more uniformly dense abrasive body.

Figure 3:
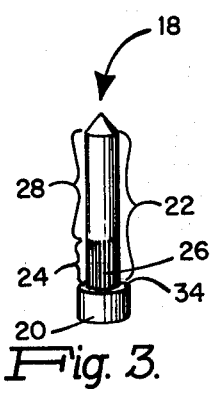
FIG. 3 is a perspective view of the support element which has been formed in the shown shape.

The method of the present invention will now be described in detail. The first step is to machine or otherwise form a support element 18 from malleable metal stock. FIG. 3 shows the support element 18 which has a first cylindrical portion 20, and a contiguous, axially aligned, second cylindrical portion 22. First portion 20 has a diameter which is larger than the diameter of the second portion 22. The second portion 22 has an initial axial length which is approximately five times as long as the length of the first portion 20.

Optionally, the surface of the part 24 of the second portion 22, which is nearer the first portion 20, is unsmooth and is provided with striations such as axial ribs or knurling 26. The surface of the part 28 of the second portion 22, which is further from the first portion 20, is smooth. The striations prevent rotation of the abrasive body, as is subsequently explained.

Figure 4:
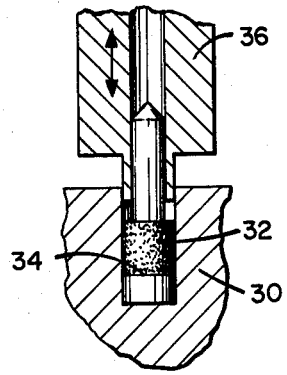
FIG. 4 is a sectional view of the support element which has been positioned in the bore of a die; of the abrasive powder which has been inserted into the bore of the die and around the smaller diameter portion of the support element; and the centrally bored ram which has compressed the abrasive powder towards the larger diameter portion of the support element.
Figure 5:
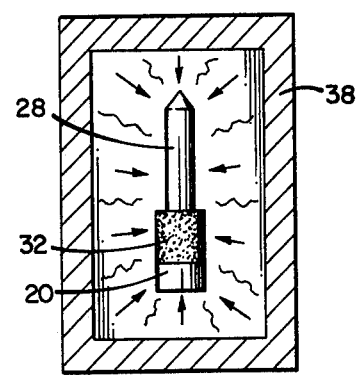
FIG. 5 is a sectional view of the support element and the abrasive body which have been placed within a sintering furnace.

After the support element 18 is formed (FIG. 3), it is inserted into the bore of a die 30. The bore has a diameter which is substantially the same as that of the first portion 20 of the support element. Preferably, the bore of the die 30 is vertical and opens upwardly as is shown in FIG. 4. The support element 18 is inserted into the bore with its second smaller diameter portion 22 extending upwardly.

Then, a precisely measured quantity of a abrasive powder 32 is inserted into the bore of die 30. As described in said Snow patent, the abrasive powder is a mixture of abrasive particles and a binder. The abrasive particles are preferably diamond grit, and the binder is preferably sinterable copper powder. Such abrasive powder mixtures are conventional. The abrasive powder 32 becomes positioned around the nearer part 24 of the second cylindrical portion 22 and rests upon the annular face 34 first cylindrical portion 20.

A hollow ram 36 is driven downwardly into the bore of die 30 to tightly compress the abrasive powder 32 against annular face 34 and against part 24 of second cylindrical portion 22. After ram 36 is withdrawn from the bore of die 30, the free end part 28 of second cylindrical portion 22 protrudes axially beyond the compressed abrasive powder 32.

The support element 18 is then placed into a sintering furnace 38 (see FIG. 5) wherein the support element and the compressed abrasive powder are sintered under heat and pressure. This sintering operation improves the internal solidification of the abrasive powder, and also improves the bond between the abrasive powder and the support element. The support element-abrasive body assembly is then allowed to cool back to room temperature.

The assembly is then positioned into the bore of a heated die 40, which is similar to die 30 except that it has a slightly larger diameter than die 30. The smaller diameter cylindrical portion 22 extends upwardly and the free end part 28 protrudes upwardly beyond the compressed abrasive body 32. A solid ram 42 is driven downwardly into the bore of heated die 40 to upset and deform the protruding part 28 from the shape shown in FIG. 5 to the shape shown in FIG. 6. The final size and shape of part 28 is very similar to that of first cylindrical portion 20. Preferably, part 28 and portion 20 have the same diameter and the same axial length. Preferably, abrasive body 32 has the same diameter, but has a greater axial length. The just-described deforming operation produces a cutting element 41 which sandwiches the abrasive body 32 tightly between part 28 and portion 20, and which securely locks the abrasive body 32 against axial movement. Rotational movement of abrasive body 32 is prevented by the unsmooth striations 26 on smaller diameter part 24 which underlie and dig into the sintered abrasive body 32. This deforming step is extremely important to the successful accomplishment of this invention.

A slight modification of the preceding step is to employ two opposed rams (unshown) which are driven towards each other within the bore of an open-ended die. One ram strikes the free end of the first cylindrical portion 20. The other ram functions like ram 42 against the free end of part 28. The resulting shape and size of cutting element 41 is exactly as shown in FIG. 6.

The FIG. 6 operation produces an extremely tight and secure bond between the abrasive body 32 and the support element 18. The operation also improves the uniform density within the abrasive body 32. Both of these results are achieved without using a separate element such as the collar used in the aforementioned Snow patent.

After cutting element 41 is removed from the bore of die 40, it is finish ground or otherwise machined on its free end faces to achieve a very smooth and symmetrical cylindrical shape. Then, the cutting element 41 is drilled or tapped throughout its entire length by the appropriate tool 44 (see FIG. 7). This operation produces a central axial bore 45.

The next step is to string a number of cutting elements 41 onto a length of flexible wire rope 46. The wire rope is preferably ordinary stranded lay rope which has a twist.

Figure 9:
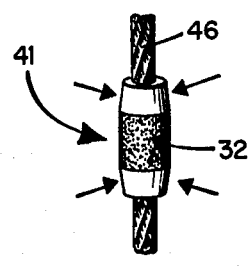
FIG. 9 is a perspective view of the support element being swaged onto the wire rope.

The next step is to swage the cutting elements 41 onto the wire rope by compressing the part 28 and the portion 20 as shown in FIG. 9. This swaging operation causes part 28 and portion 20 to become slightly conical in shape as shown in FIG. 9 which improves the sawing action of each cutting element 41 as it is pulled by the sawing machine 10 through the granite block 16.

The cutting elements 41 are swaged onto the wire rope in a spaced-apart arrangement as shown in FIG. 2. The wire rope is then spliced together to make a continuous loop for placement on the pulley wheels 12 as shown in FIG. 1. The resulting abrasive wire 14 is an effective cutting instrument which has great cutting power and an unusually long life.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:

1. In a conventional method of making an abrasive wire for sawing stone, said conventional method comprising the following steps:
  (a) forming a support element of malleable metal into a shape comprising two contiguous, axially aligned, cylindrical portions, the first portion having a larger diameter and the second portion having a smaller diameter;
  (b) positioning the support element into the bore of a die, the bore having the same diameter as that of the first portion of the support element;
  (c) inserting a quantity of abrasive powder containing a mixture including diamond grit and a sinterable metal binder into the bore of the die, the abrasive powder being positioned around the second portion of the support element;
  (d) compressing the abrasive powder axially towards the first portion of the support element, a part of the second portion of the support element protruding axially beyond the compressed abrasive powder;
  (e) sintering the abrasive powder to produce a solid abrasive body;

(f) affixing the solid abrasive body to the support element;

(g) forming a central axial bore through the support element;

(h) inserting a length of flexible wire rope through the support element bore; and (i) affixing the support element to the wire rope; the improvement to said foregoing conventional method comprising: affixing the solid abrasive body to the support element by deforming the part of the second portion of the support element protruding axially beyond the compressed abrasive powder, said deformed second portion part having the same diameter as that of the first portion.

2. The method of claim 1 wherein the axial length of the smaller diameter part of the second portion is equal to the axial length of the solid abrasive body.

3. The method of claim 1 wherein the axial length of the larger diameter part of the second portion is equal to the axial length of the first portion.

4. The method of claim 2 wherein the axial length of the larger diameter part of the second portion is equal to the axial length of the first portion.

5. The method of claim 3 wherein the axial length of the larger diameter part of the second portion is shorter than the axial length of the solid abrasive body.

6. The method of claim 1 wherein said deforming is accomplished by an axially moving ram.

7. The method of claim 6 wherein said deformed second portion part has the shape of a cylinder.

8. The method of claim 7 wherein the deformed cylindrical second portion part has approximately the same size and shape as the first cylindrical portion.

9. The method of claim 1 wherein the smaller diameter part of the second portion of the support element is formed with an unsmooth surface.

10. The method of claim 9 wherein the unsmooth surface is a striated surface.

* * * * *